May 19, 1942.  A. J. LUDWIG  2,283,607

MUFFLER DEVICE

Filed Dec. 27, 1940

INVENTOR
ALBERT J. LUDWIG
BY
ATTORNEY

Patented May 19, 1942

2,283,607

UNITED STATES PATENT OFFICE 2,283,607

MUFFLER DEVICE

Albert J. Ludwig, Wilkinsburg, Pa., assignor to The Westinghouse Air Brake Company, Wilmerding, Pa., a corporation of Pennsylvania Application December 27, 1940, Serial No. 371,890

1 Claim. (Cl. 181—33)

This invention relates to fluid pressure brakes and more particularly to means for silencing the exhaust of fluid under pressure from vent ports or pipes in fluid pressure brake systems or the like, and for also preventing closure of ports or pipes by insects or foreign matter such as mud, snow, ice, etc.

The principal object of the invention is the provision of an improved combined muffler or silencer and protector device of the above type.

Figure 1:
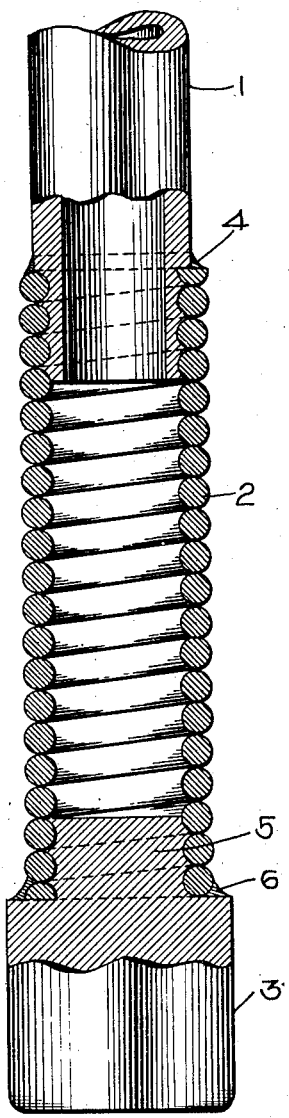
Figure 2:
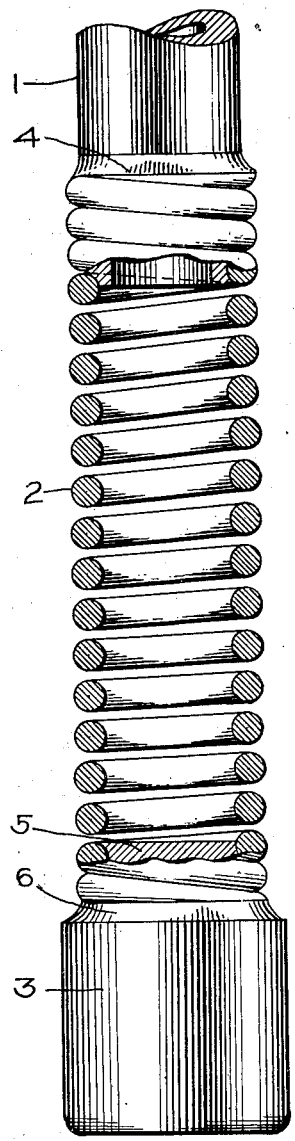

In the accompanying drawing; Fig. 1 is a longitudinal cross-sectional view of the improved device showing the parts thereof in a normal or non-exhaust position; and Fig. 2 is a view similar to Fig. 1 showing the parts in a position which may be assumed while fluid under pressure is being discharged therethrough.

In the drawing, the reference numeral 1 indicates a pipe, a port or a passage through which fluid under pressure is adapted to be vented or exhausted. This pipe may be a part of a fluid pressure brake equipment through which fluid under pressure is adapted to be released from a brake cylinder device or through which fluid under pressure is adapted to be exhausted from any other part of the equipment, or it may be a similar part of any other type of apparatus; a fluid pressure brake equipment being mentioned merely for the purpose of illustrating one use of the invention.

According to the invention a coil spring 2 is provided which has one end secured to the end of pipe 1 while secured to the other end of said spring is a cap 3 which closes the end of the spring and which is of a chosen weight. The spring 2 is preferably wound with the coils in contact with each other and with an initial tension to counterbalance the weight of cap 3 so that with the spring in a static condition supporting said cap the spring will not be extended.

As shown in the drawing, one end of the spring 2 is fitted over the pipe 1 and is secured in place by a weld 4, while the opposite end is fitted over a projecting portion 5 of the cap 3 and secured thereto by a weld 6. The end of the pipe 1 and the projecting portion 5 of the cap 3 may, if desired, be provided with helical grooves, as shown, through which the end coils of the spring may be turned to the position shown, for welding, as just mentioned.

In use, when the pipe 1, and therefore the interior of the coil 2, is void of fluid under pressure and when said pipe is in a static condition, the coils of spring 2 will all be closed against each other as shown in Fig. 1.

Assume that the pipe 1 is an exhaust pipe of a fluid pressure brake system on a vehicle which is moving along a track. Under this condition the parts of the vehicle including the pipe 1 will be subject to certain vibration in a vertical direction as well as in a horizontal direction. This vibratory movement of pipe 1 acting in conjunction with the inertia of the cap 3 will, as will be apparent, create relative movement between the two ends of as well as between the intermediate coils of the spring. If the movement or vibration of pipe 1 is horizontal the relative movement between the different parts of the spring will be due to bending thereof about its axis. This bending may be first in one direction and then in another direction, i. e., an oscillatory movement, or it may occur from a more or less circular movement of the cap. In the case of vertical vibration of pipe 1 the inertia of cap 3 will cause alternate extending and contracting of the spring. Either of these types of vibration, or a combination of both, will therefore cause substantially continuous relative movement between the coils of the spring and this movement will effectively prevent an accumulation of foreign matter such as caked mud or ice on the spring which would tend to secure the coils to each other. In other words, where applied to a part of a vehicle subject to vibration, the inertia of cap 3 will act to maintain the coils of spring 2 free of foreign matter and of each other so that the device may operate as intended, as will be presently described.

It is desired to point out that the spring 2 will be operated as above described to maintain itself free of foreign matter in substantially any position as long as space is provided for movement of cap 3 relative to pipe 1. In other words, the spring 2 may be applied to pipe 1 so as to depend therefrom as shown in the drawing. If the pipe 1 opens upwardly, however, the device may be applied thereto and extend upwardly in a vertical direction, whereas if the pipe should be disposed at any angle between these vertical positions the device may be applied at the corresponding angle and will still function as intended.

When fluid under pressure is supplied to pipe 1 to be vented to the atmosphere, this fluid flows to the interior of the spring 2. With the coils of the spring in substantial contact with each other there will be little leakage of fluid from the interior of the spring, so that the fluid supplied through pipe 1 will create a pressure within the spring acting on the portion 5 of cap 3. When the pressure of fluid acting on portion 5 of cap 3 is thus increased to a degree sufficient to overcome the tension of spring 2, said cap will be pushed downwardly and extend the spring so as to pull the coils out of contact with each other and thus open a vent communication for releasing the fluid under pressure from within the spring and thereby from pipe 1. It will be noted that this vent communication will be in the form of a relatively long and thin spiral slot extending from the end of pipe 1 to the adjacent end of the projection 5 of cap 3.

When the pressure of fluid being vented from pipe 1, and from the interior of the spring, becomes reduced to a sufficiently low degree, the tension of spring 2 will urge the coils of the spring back into contact. Any fluid pressure remaining in pipe 1 and spring 2 will then leak away between the coils of the spring.

It has been found in practice that this device effectively muffles the exhaust of fluid under pressure and due to the ability of the device to maintain its coils free for movement relative to each other, the device is always in condition to operate efficiently even though located in a position where it is open to the weather and therefore subject to splash of water, slush and mud such as exists under railway vehicles.

When fluid under pressure is being discharged from the pipe 1 through the spring 2, the spring is only momentarily extended and there is a rush of air from the interior to the exterior thereof. At all other times the spring will occupy a position in which its coils are in substantial contact with each other. If the pipe 1 is in a static condition, the spring coils will be in contact with each other throughout their full length while in case the pipe is subject to vibration the openings created between the coils of the spring due to the effect of inertia on cap 3 will be relatively small and only momentary. It will therefore be apparent that the spring will effectively prevent the entrance of insects to the interior thereof and to the pipe 1 as well as the entrance of other foreign matter, thereby insuring that said pipe and the interior of the spring will not become clogged with foreign matter.

Summary

It will now be apparent that the improved device will not only provide effective protection to a vent port, pipe or the like against becoming clogged with foreign matter but it will also act to effectively silence the exhaust of fluid under pressure, and the intended operation of the device is assured, even though the device is installed in a location where it will be subject to the splash of water, mud or slush in freezing weather, as long as the installation provides for a certain degree of vibration of the parts to which the device is attached.

While only one illustrative embodiment of the invention has been described in detail, it is not the intention to limit the scope to that embodiment or otherwise than by the terms of the appended claim.

Having now described my invention, what I claim as new and desire to secure by Letters Patent is:

A device for silencing the exhaust of fluid under pressure from a vertically and downwardly extending vibratory pipe or the like comprising in combination, a downwardly extending coil spring having one end secured to said pipe with the interior of said spring open to the interior of said pipe, closure means closing the opposite and lowermost end of said spring and adapted to be operated by fluid under pressure exhausted from said pipe to the interior of said spring to extend said spring for venting fluid under pressure from the interior of said spring through space thus created between coils of said spring, and means attached to the said closure means and extending vertically downward from said spring and cooperative with said pipe upon vibration of said pipe to create relative movement between the opposite ends of said spring and thereby between coils of said spring to maintain such coils free for movement relative to each other, said spring being formed with an initial tension sufficient to urge the coils thereof into contact with each other against opposition of said last means when the pipe, spring and last named means are in vertical alignment and in a static condition.

ALBERT J. LUDWIG.